US009751982B2

(12) United States Patent
Heymans et al.

(10) Patent No.: US 9,751,982 B2
(45) Date of Patent: Sep. 5, 2017

(54) POLYETHER POLYOL RESINS COMPOSITIONS

(71) Applicants: MOMENTIVE SPECIALTY CHEMICALS RESEARCH BEIGIUM S.A., Ottignies, Louvain-la-neuve (BE); MOMENTIVE SPECIALTY CHEMICALS INC., Stafford, TX (US)

(72) Inventors: Denis Heymans, Ottignies-Louvain-la-Neuve (BE); Christophe Steinbrecher, Ottignies-Louvain-la-Neuve (BE); Cédric Le Fevere De Ten Hove, Ottignies-Louvain-la-Neuve (BE)

(73) Assignee: HEXION INC, Columbus, OH (US)

( * ) Notice: Subject to any disclaimer, the term of this patent is extended or adjusted under 35 U.S.C. 154(b) by 421 days.

(21) Appl. No.: 14/352,247

(22) PCT Filed: Oct. 16, 2012

(86) PCT No.: PCT/EP2012/004320
§ 371 (c)(1),
(2) Date: Apr. 16, 2014

(87) PCT Pub. No.: WO2013/056814
PCT Pub. Date: Apr. 25, 2013

(65) Prior Publication Data
US 2014/0227540 A1    Aug. 14, 2014

(30) Foreign Application Priority Data

Oct. 19, 2011 (EP) .................... 11075232
Apr. 5, 2012 (EP) .................... 12002493

(51) Int. Cl.
| | |
|---|---|
| B32B 15/08 | (2006.01) |
| B32B 27/28 | (2006.01) |
| C09D 171/00 | (2006.01) |
| C08G 65/28 | (2006.01) |
| C07C 41/03 | (2006.01) |
| C08G 65/22 | (2006.01) |
| C08G 63/664 | (2006.01) |
| C08G 65/332 | (2006.01) |
| C09D 7/12 | (2006.01) |
| C08G 65/14 | (2006.01) |
| C08G 65/26 | (2006.01) |
| C09D 171/02 | (2006.01) |

(52) U.S. Cl.
CPC ........... *C08G 65/22* (2013.01); *C08G 63/664* (2013.01); *C08G 65/14* (2013.01); *C08G 65/2609* (2013.01); *C08G 65/3322* (2013.01); *C09D 7/125* (2013.01); *C09D 171/00* (2013.01); *C09D 171/02* (2013.01); *Y10T 428/31504* (2015.04); *Y10T 428/31678* (2015.04)

(58) Field of Classification Search
None
See application file for complete search history.

(56) References Cited

U.S. PATENT DOCUMENTS

| | | |
|---|---|---|
| 2,831,877 A | 4/1958 | Koch et al. |
| 2,876,241 A | 3/1959 | Koch et al. |
| 2,967,873 A | 1/1961 | Moller et al. |
| 3,053,869 A | 9/1962 | Knights et al. |
| 3,061,621 A | 10/1962 | Koch et al. |
| 3,479,416 A | 11/1969 | Tschopp et al. |
| 3,849,364 A | 11/1974 | Vandenberg |
| 3,979,474 A | 9/1976 | Zerrweck |
| 4,086,151 A | 4/1978 | Stevens et al. |
| 5,051,492 A | 9/1991 | Andre et al. |
| 5,681,906 A | 10/1997 | Yezrielev et al. |
| 5,753,756 A | 5/1998 | Aerts |
| 5,869,191 A | 2/1999 | Clemons Van Gaalen et al. |
| 6,087,464 A | 7/2000 | Swarup et al. |
| 6,121,389 A | 9/2000 | Kooijmans et al. |
| 6,136,991 A | 10/2000 | Ryan et al. |
| 6,433,217 B1 | 8/2002 | Rosenbrand et al. |
| 6,433,242 B1 * | 8/2002 | Wiese .............. C07C 7/04 203/100 |
| 6,592,944 B1 | 7/2003 | Uhlianuk et al. |
| 2003/0149227 A1 | 8/2003 | Okazaki |
| 2005/0176979 A1 | 8/2005 | Stichter et al. |
| 2007/0117938 A1 | 5/2007 | Martz et al. |
| 2009/0137751 A1 | 5/2009 | Knott et al. |
| 2014/0248502 A1 | 9/2014 | Heymans et al. |
| 2014/0248503 A1 | 9/2014 | Heymans et al. |
| 2014/0256906 A1 | 9/2014 | Steinbrecher et al. |
| 2014/0295193 A1 | 10/2014 | Heymans et al. |

FOREIGN PATENT DOCUMENTS

| | | |
|---|---|---|
| DE | 102009056187 | 7/2010 |
| EP | 1033360 A1 | 9/2000 |

(Continued)

OTHER PUBLICATIONS

Hampshire, "Glycidyl Ester Based Hydroxylated Polyesters for Coatings and Adhesive Applications" Research Disclosure, Mason Publications, vol. 505, No. 44 (May 1, 2006) GB.

(Continued)

*Primary Examiner* — Michael J Feely

(57) ABSTRACT

The invention relates to compositions of polyether polyol resins (hydroxyfunctional oligo or poly ether) comprising a mixture of α,α-branched alkane carboxylic glycidyl esters derived from butene oligomers characterized in that the sum of the concentration of the blocked and of the highly branched isomers is maximum 55%, preferably below 40%, and most preferably below 30% weight on total composition.

23 Claims, No Drawings

(56) References Cited

FOREIGN PATENT DOCUMENTS

| | | |
|---|---|---|
| EP | 1283226 | 2/2003 |
| EP | 1580609 | 9/2005 |
| JP | 6032803 | 2/1985 |
| JP | S60262821 | 12/1985 |
| JP | 4314797 | 11/1992 |
| WO | WO 00/17179 A1 | 3/2000 |
| WO | WO0125225 | 4/2001 |
| WO | WO0156966 | 8/2001 |
| WO | WO0039180 | 10/2001 |
| WO | WO 2007/041633 A1 | 4/2007 |
| WO | WO 2010/142396 A1 | 12/2010 |
| WO | WO2012/052126 | 4/2012 |
| WO | WO2012/084265 | 6/2012 |
| WO | WO 2013/056813 A1 | 4/2013 |
| WO | WO 2013/056817 A1 | 4/2013 |

OTHER PUBLICATIONS

Hampshire, "Glycidyl Ester Based Hydroxylated Polyesters" Research Disclosure, Mason Publications, vol. 563, No. 16 (Mar. 1, 2011) p. 311, GB.

Kawasaki et al., "Low Pressure Koch Reaction by Cu(CO)n+—$H_2SO_4$—$H_3PO_4$—$H_2O$ Catalyst (Part 4) Structural Analysis . . .", Sekiyu Gakkashi, vol. 37, No. 4, 1994, p. 448-454, Japan.

Yoneda et al., "Carboxylation of Isobutylene and Related Olefins with Carbon . . .", Bulletin of Japanese Petroleum Institute, vol. 14, No. 2, Nov. 1972, p. 178-186, Japan.

\* cited by examiner

POLYETHER POLYOL RESINS COMPOSITIONS

RELATED APPLICATION DATA

This application claims the benefit of PCT Application PCT/EP2012/004320 with an International Filing Date of Oct. 16, 2012, published as WO 2013/056814 A1, which further claims priority to European Patent Application No. EP11075232.6 filed Oct. 19, 2011, and European Patent Application No. EP 12002493.0 filed Apr. 05, 2012; the entire contents of all are hereby incorporated by reference.

The present invention relates to a composition of polyether polyol resins comprising a mixture of α, α-branched alkane carboxylic glycidyl esters derived from butene oligomers characterized in that the sum of the concentration of the blocked and of the highly branched isomers is maximum 55%, preferably below 40%, and most preferably below 30% weight on total composition.

More in particular the invention relates to polyether polyol resins compositions comprising of aliphatic tertiary saturated carboxylic acids or α,α-branched alkane carboxylic acids, which contain 9 or 13 carbon atoms and which provide glycidyl esters with a branching level of the alkyl groups depending on the olefin feedstock used and/or the oligomerization process thereof, and which is defined as below.

The glycidyl ester derived from propene or containing 5 carbon atoms in the alkyl chain are used by the industry to introduce modified resins by reaction such a glycidyl ester with polyols. U.S. Pat. No. 5,051,492 is about the process to prepare such a modified resins using metal salt to carry out the etherification reaction of a polyol and a 10 carbon chain alkyl glycidyl ester. The WO2007/041633 introduces the modification of C5 glycidyl ester, which as for effect to provide a coating composition with a low content of volatile organic compounds. The same technical approach was given in US 2007/0117938.

It is generally known from e.g. U.S. Pat. Nos. 2,831,877, 2,876,241, 3,053,869, 2,967,873 and 3,061,621 that mixtures of α,α-branched alkane carboxylic acids can be produced, starting from mono-olefins, carbon monoxide and water, in the presence of a strong acid.

One of the more recent method has been disclosed in EP 1033360A1. The problem of providing better softening derivatives of α,α-branched acids, manufactured from alkenes, carbon monoxide and water and a nickel catalyst was solved therein by a process, which actually comprised:
  (a) oligomerization of butene;
  (b) separation of butene dimers and/or trimers from the oligomerizate;
  (c) conversion of the butene dimers and/or trimers into carboxylic acids;
  (d) conversion of the carboxylic acids into the corresponding vinyl esters showing attractive softening properties when mixed into other polymers or if used as comonomers in coatings.

If the olefin feed is based on Raf. II or Raf. III or any mixture rich in n-butene isomers on the total olefins, the subsequently mixture of neo-acid (C9 or C13 acids) derivatives will provide a mixture where the concentration of blocked and highly branched isomers is maximum 55%, preferably below 40%, and most preferably below 30%.

The glycidyl esters can be obtained according to PCT/EP2010/003334 or the U.S. Pat. No. 6,433,217.

We have discovered that well chosen blend of isomers of the glycidyl ester of mixture compositions of neo-acid (C9 or C13 acids) glycidyl ester, is providing for example a good leveling of a coating, is a mixture where the sum of the concentration of blocked and highly branched isomers is maximum 55%, preferably below 40%, and most preferably below 30% weight on total composition.

We have further discovered that well chosen blend of isomers of the glycidyl ester of, for example, neononanoic acids give different and unexpected performance in combination with some particular polymers such as polyether polyols.

The isomers are described in Table 1 and illustrated in Scheme 1.

We have found that the performance of the glycidyl ester compositions derived from the branched acid is depending on the branching level of the alkyl groups $R^1$, $R^2$ and $R^3$, for example the neononanoic acid has 3, 4 or 5 methyl groups. Highly branched isomers are defined as isomers of neo-acids having at least 5 methyl groups.

Neo-acids, for example neononanoic acids (V9) with a secondary or a tertiary carbon atoms in the β position are defined as blocking isomers.

Mixture compositions of neononanoic (C9) acids glycidyl esters providing for example a good leveling of a coating, is a mixture where the sum of the concentration of the blocked and of the highly branched isomers derivatives is maximum 55%, preferably below 40%, and most preferably below 30% weight on total composition.

Furthermore the above compositions of neononanoic acids glycidyl esters mixture is comprising 2,2-dimethyl heptanoic acid glycidyl ester or 2-methyl 2-ethyl hexanoic acid glycidyl ester or 2-methyl 2-ethyl 3-methyl pentanoic acid glycidyl esters.

Furthermore the above compositions of neononanoic acids glycidyl esters mixture is comprising 2-methyl 2-ethyl 3-methyl pentanoic acid glycidyl esters (sum of stereoisomers) below 40%, preferably below 30% and most preferably below or equal 25% weight on total composition.

Furthermore the above compositions of neononanoic acids glycidyl esters mixture is comprising 2-methyl 2-ethyl hexanoic acid glycidyl ester above 10%, preferably above 30% and most preferably above 45% weight on total composition.

The above compositions of the glycidyl ester mixture is comprising 2,2-dimethyl heptanoic acid glycidyl ester and 2-methyl 2-ethyl hexanoic acid glycidyl ester and 2-methyl 2-ethyl 3-methyl pentanoic acid glycidyl esters (sum of stereoisomers) is above 40%, preferably 55% and most preferably 65% weight on total composition.

A preferred composition is comprising a mixture of 2,2-dimethyl heptanoic acid glycidyl ester in 1 to 15 weight % and 2-methyl 2-ethyl hexanoic acid glycidyl ester in 40 to 70 weight % and 2-methyl 2-ethyl 3-methyl pentanoic acid glycidyl esters (sum of stereoisomers) in 8 to 32 weight % on total composition.

A further preferred composition is comprising a mixture of 2,2-dimethyl heptanoic acid glycidyl ester in 2 to 10 weight % and 2-methyl 2-ethyl hexanoic acid glycidyl ester in 47 to 61 weight % and 2-methyl 2-ethyl 3-methyl pentanoic acid glycidyl esters (sum of stereoisomers) in 10 to 25 weight % on total composition.

The above glycidyl esters compositions can be used for example, as reactive diluent or as monomer in binder compositions for paints or adhesives.

The glycidyl esters compositions can be used as reactive diluent for epoxy based formulations such as exemplified in the technical brochure of Momentive (Product Bulletin: Cardura E10P The Unique Reactive Diluent MSC-512).

Other uses of the glycidyl ester are the combinations with polyester polyols, or acrylic polyols, or polyether polyols. The combination with polyether polyols such as could be used in the car industry coating leads to coating system with attractive coating appearance.

Methods Used

The isomer distribution of neo-acid can be determined using gas chromatography, using a flame ionization detector (FID). 0.5 ml sample is diluted in analytical grade dichloromethane and n-octanol may be used as internal standard. The conditions presented below result in the approximate retention times given in table 1. In that case n-octanol has a retention time of approximately 8.21 minute.

The GC method has the following settings:
Column: CP Wax 58 CB (FFAP), 50 m×0.25 mm, df=0.2 µm
Oven program: 150° C. (1.5 min)-3.5° C./min-250° C. (5 min)=35 min
Carrier gas: Helium
Flow: 2.0 mL/min constant
Split flow: 150 mL/min
Split ratio: 1:75
Injector temp: 250° C.
Detector temp: 325° C.
Injection volume: 1 µL
CP Wax 58 CB is a Gas chromatography column available from Agilent Technologies.

The isomers of neononanoic acid as illustrative example have the structure $(R^1R^2R^3)$—C—COOH where the three R groups are linear or branched alkyl groups having together a total of 7 carbon atoms.

The structures and the retention time, using the above method, of all theoretical possible neononanoic isomers are drawn in Scheme 1 and listed in Table 1.

The isomers content is calculated from the relative peak area of the chromatogram obtained assuming that the response factors of all isomers are the same.

TABLE 1

Structure of all possible neononanoic isomers

| | R1 | R2 | R3 | Methyl groups | Blocking | Retention time [Minutes] |
|---|---|---|---|---|---|---|
| V901 | Methyl | Methyl | n-pentyl | 3 | No | 8.90 |
| V902 | Methyl | Methyl | 2-pentyl | 4 | Yes | 9.18 |
| V903 | Methyl | Methyl | 2-methyl butyl | 4 | No | 8.6 |
| V904 | Methyl | Methyl | 3-methyl butyl | 4 | No | 8.08 |
| V905 | Methyl | Methyl | 1,1-dimethyl propyl | 5 | Yes | 10.21 |
| V906 | Methyl | Methyl | 1,2-dimethyl propyl | 5 | Yes | 9.57 |
| V907 | Methyl | Methyl | 2,2-dimethyl propyl | 5 | No | 8.26 |
| V908 | Methyl | Methyl | 3-pentyl | 4 | Yes | 9.45 |
| V909 | Methyl | Ethyl | n-butyl | 3 | No | 9.28 |
| V910 K1 | Methyl | Ethyl | s-butyl | 4 | Yes | 9.74 |
| V910 K2 | Methyl | Ethyl | s-butyl | 4 | Yes | 9.84 |
| V911 | Methyl | Ethyl | i-butyl | 4 | No | 8.71 |
| V912 | Methyl | Ethyl | t-butyl | 5 | Yes | 9.64 |
| V913 | Methyl | n-propyl | n-propyl | 3 | No | 8.96 |
| V914 | Methyl | n-propyl | i-propyl | 4 | Yes | 9.30 |
| V915 | Methyl | i-propyl | i-propyl | 5 | Yes | 9.74 |
| V916 | Ethyl | Ethyl | n-propyl | 3 | No | 9.44 |
| V917 | Ethyl | Ethyl | i-propyl | 4 | Yes | 10.00 |

The isomer distribution of glycidyl esters of neo-acid can be determined by gas chromatography, using a flame ionization detector (FID). 0.5 ml sample is diluted in analytical grade dichloromethane.

The GC method has the following settings:
Column: CP Wax 58 CB (FFAP), 50 m×0.2 mm, df=0.52 µm
Oven: 175° C. (5 min)-1° C./min-190° C. (0 min)-10° C./min-275° C. (11.5 min)
Flow: 2.0 mL/min, constant flow
Carrier gas: Helium
Split ratio: 1:75
Injection volume: 1 µL
S/SL injector: 250° C.
CP Wax 58 CB is a Gas chromatography column available from Agilent Technologies.

The isomers of glycidyl esters of neononanoic acid as illustrative example have the structure $(R^1R^2R^3)$—C—COO—$CH_2$—CH(O)$CH_2$ where the three R groups are linear or branched alkyl groups having together a total of 7 carbon atoms.

The isomers content is calculated from the relative peak area of the chromatogram obtained assuming that the response factors of all isomers are the same.

GC-MS method can be used to identify the various isomers providing that the analysis is done by a skilled analytical expert.

Scheme 1: Structure of all possible neonanoic isomers

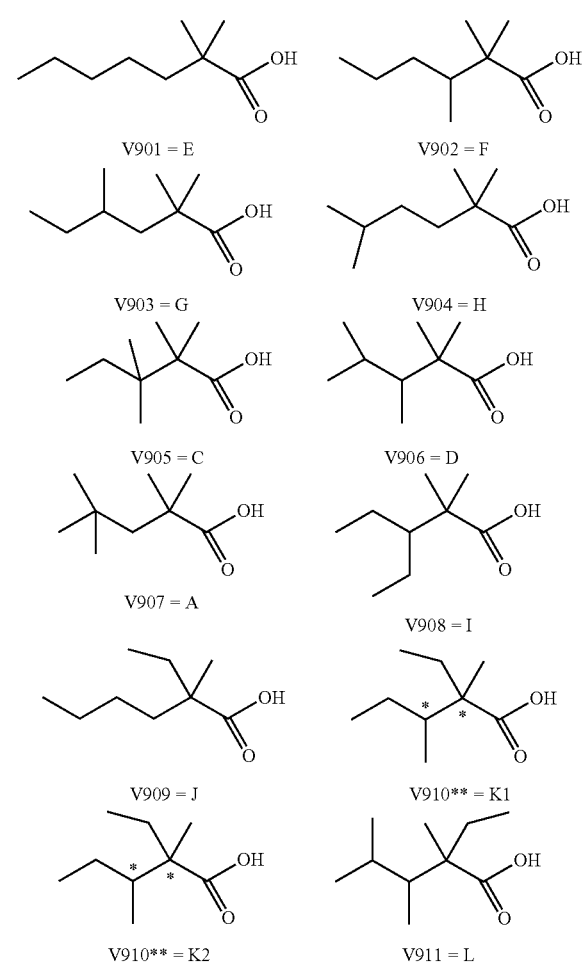

V901 = E  V902 = F

V903 = G  V904 = H

V905 = C  V906 = D

V907 = A

V908 = I

V909 = J  V910** = K1

V910** = K2  V911 = L

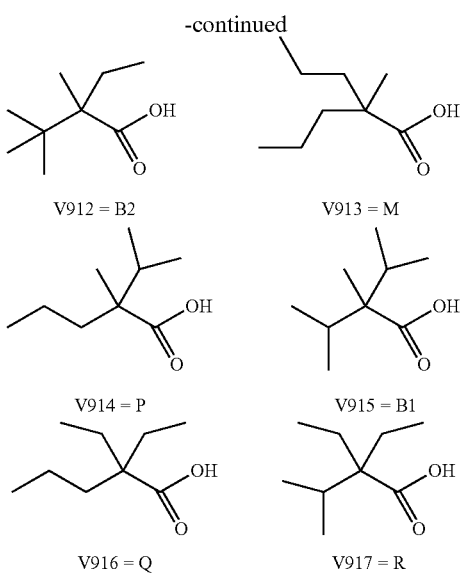

V912 = B2
V913 = M
V914 = P
V915 = B1
V916 = Q
V917 = R

Methods for the Characterization of the Resins

The molecular weights of the resins are measured with gel permeation chromatography (Perkin Elmer/Water) in THF solution using polystyrene standards. Viscosity of the resins are measured with Brookfield viscometer (LVDV-I) at indicated temperature. Solids content are calculated with a function (Ww−Wd)/Ww×100%. Here Ww is the weight of a wet sample, Wd is the weight of the sample after dried in an oven at a temperature 110° C. for 1 hour.

Tg (glass transition temperature) has been determined either with a DSC 7 from Perkin Elmer or with an apparatus from TA Instruments Thermal Analysis. Scan rates were respectively 20 and 10° C./min. Only data obtained in the same experimental conditions have been compared. If not, the temperature difference occurring from the different scanning rate has been proved not significant for the results compared.

Blocking Isomers

Whereas the carbon atom in alpha position of the carboxylic acid is always a quaternary carbon atom, the carbon atom(s) in β position can either be secondary, tertiary, or quaternary. Neononanoic acids (V9) with a tertiary or a quaternary carbon atoms in the β position are defined as blocking isomers (Schemes 2 & 3).

Scheme 2

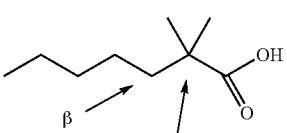

Scheme 2: Example of a Non-blocked V9 Structure

Scheme 3

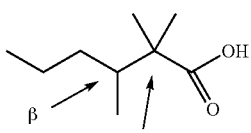

Scheme 3: Example of a Blocked V9 Structure β

The use of the glycidyl esters compositions, discussed here above, can be as monomer in binder compositions for paints and adhesives. These binders can be based on a polyether polyol resin comprising the above composition glycidyl ester compositions.

The polyether polyol resins of the invention are based on a composition of hydroxyl functional polyether resins (polyether polyols) comprising a mixture of α,α-branched alkane carboxylic glycidyl esters derived from butene oligomers characterized in that the sum of the concentration of the blocked and of the highly branched isomers is maximum 55%, preferably below 40%, and most preferably below 30% weight on total composition, reacted with a polyol.

A preferred composition is that the glycidyl ester mixture is based on neononanoic (C9) acid mixture where the sum of the concentration of the blocked and of the highly branched isomers is maximum 55%, preferably below 40%, and most preferably below 30% weight on total composition.

Further the neononanoic (C9) glycidyl ester mixture is comprising 2,2-dimethyl heptanoic acid glycidyl ester or 2-methyl 2-ethyl hexanoic acid glycidyl ester or 2-methyl 2-ethyl 3-methyl pentanoic acid glycidyl ester.

Another embodiment is that the composition of the glycidyl ester mixture is comprising 2-methyl 2-ethyl 3-methyl pentanoic acid glycidyl esters (sum of stereoisomers) below 40%, preferably below 30% and most preferably below or equal 25% weight on total composition.

A further embodiment is that the composition of the glycidyl ester mixture is comprising 2-methyl 2-ethyl hexanoic acid glycidyl ester above 10%, preferably above 30% and most preferably above 45% weight on total composition.

A further embodiment is that the composition of the glycidyl ester mixture is comprising 2,2-dimethyl heptanoic acid glycidyl ester and 2-methyl 2-ethyl hexanoic acid glycidyl ester and 2-methyl 2-ethyl 3-methyl pentanoic acid glycidyl esters (sum of stereoisomers) is above 40%, preferably 55% and most preferably 65% weight on total composition.

A further embodiment is that the composition of the glycidyl ester mixture is comprising 2,2-dimethyl heptanoic acid glycidyl ester in 1 to 15 weight % and 2-methyl 2-ethyl hexanoic acid glycidyl ester in 40 to 70 weight % and 2-methyl 2-ethyl 3-methyl pentanoic acid glycidyl esters (sum of stereoisomers) in 8 to 32 weight % on total composition.

A further embodiment is that the composition of the glycidyl ester mixture is comprising 2,2-dimethyl heptanoic acid glycidyl ester in 2 to 10 weight % and 2-methyl 2-ethyl hexanoic acid glycidyl ester in 47 to 61 weight % and 2-methyl 2-ethyl 3-methyl pentanoic acid glycidyl esters (sum of stereoisomers) in 10 to 25 weight % on total composition.

The process to prepare the compositions of the polyether polyol resin is by reaction of a polyol selected from for example: trimethylolpropane, ditrimethylolpropane, pentaerythritol, dipentaerythritol, tripentaerythritol, neopentyl glycol, glycerine, ethyleneglycol, cyclohexane dimethylol 1,4, mannitol, xylitol, isosorbide, erythritol, sorbitol, ethylene glycol, 1,2-propylene glycol, 1,2-butylene glycol, 2,3-butylene glycol, 1,2-hexanediol, 1,2-dihydroxycyclohexane, 3-ethoxypropane-1,2-diol and 3-phenoxypropane-1,2-diol; neopentyl glycol, 2-methyl-1,3-propanediol, 2-methyl-2,4-pentanediol, 3-methyl-1,3-butane diol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1, 3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropyonate (an esterification product of hydroxy-pivalic acid with neopentyl glycol), 2,2,4-Trimethyl-1,3-pentanediol(TMPD), mixture of 1,3-and 1,4-cyclohexanedimethanol (=Unoxol diol ex Dow Chemicals), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetroxaspiro [5,5]-undecane, di-ethylene glycol, triethylene glycol, glycerine, diglycerine, triglycerine, trimethylol-ethane and tris (2-hydroxyethyl)isocyanurate. Either pure multifunctional polyol can be used or mixtures of at least two of them, and the glycidyl ester mixture as define above.

The polyether polyol resins of the invention prepared according to the above processes will have a number average molecular weight (Mn) lower than 4500 Dalton according the polystyrene standard, and/or the hydroxyl value is above 120 mg KOH/g solids on solid.

The invention is also related to a binder composition useful for coating composition comprising at least any hydroxyl functional polyether resins as prepared above and having a low VOC.

The said binder compositions are suitable for coating metal or plastic substrates.

EXAMPLES

Chemicals Used
Cardura™ E10: available from Momentive Specialty Chemicals
Neononanoic glycidyl ester from Momentive Specialty Chemicals
GE9S: neononanoic glycidyl ester of composition A (see Table 2)
GE9H: neononanoic glycidyl ester of composition B (see Table 2)
Neononanoic glycidyl ester of composition C (see Table 2)
Neononanoic glycidyl ester of composition D (see Table 2)
Neononanoic glycidyl ester of composition E (see Table 2)

TABLE 2

Composition of the neononanoic glycidyl ester (according to the described gas chromatography method for glycidyl esters of neo-acid)

| Glycidyl ester of acid V9XX (described in Table 1) | A (%) | B (%) | C (%) | D (%) | E (%) |
|---|---|---|---|---|---|
| V901 | 6.5 | 0.1 | 3.7 | 0.1 | 8.9 |
| V902 | 0.6 | 2.55 | 0.6 | 2.4 | 0.7 |
| V903 | 1.1 | 0.7 | 0.3 | 1.0 | 2.0 |
| V904 | 0.8 | 1 | 0.1 | 2.2 | 1.8 |
| V905 | 0.2 | 13.1 | 0.5 | 4.1 | 0.1 |
| V906 | 0.4 | 11.6 | 0.4 | 9.6 | 0.4 |
| V907 | 0.2 | 15.4 | 0.1 | 36.4 | 0.6 |
| V908 | 0.1 | 0 | 0.1 | 0.0 | 0.1 |
| V909 | 54.8 | 2.55 | 52.8 | 2.4 | 52.8 |
| V910 K1 | 7.8 | 0 | 10.0 | 0.0 | 6.5 |
| V910 K2 | 7.7 | 0.6 | 12.8 | 0.4 | 4.8 |
| V911 | 2.4 | 1.2 | 0.7 | 2.0 | 4.2 |
| V912 | 0.0 | 28.3 | 0.0 | 22.4 | 0.0 |
| V913 | 6.8 | 0.1 | 6.4 | 0.1 | 6.5 |
| V914 | 4.5 | 0 | 3.8 | 0.0 | 5.7 |
| V915 | 0.6 | 22.3 | 0.6 | 16.8 | 0.4 |
| V916 | 4.4 | 0.1 | 5.2 | 0.1 | 3.8 |
| V917 | 1.1 | 0.4 | 2.1 | 0.1 | 0.5 |

GE5: glycidyl ester of pivalic acid obtained by reaction of the acid with epichlorhydrin.
Ethylene glycol from Aldrich
Monopentaerythritol: available from Sigma-Aldrich
3,3,5 Trimethyl cyclohexanol: available from Sigma-Aldrich
Maleic anhydride: available from Sigma-Aldrich
Methylhexahydrophtalic anhydride: available from Sigma-Aldrich
Hexahydrophtalic anhydride: available from Sigma-Aldrich
Boron trifluoride diethyl etherate (BF3.OEt2) from Aldrich
Acrylic acid: available from Sigma-Aldrich
Methacrylic acid: available from Sigma-Aldrich
Hydroxyethyl methacrylate: available from Sigma-Aldrich
Styrene: available from Sigma-Aldrich
2-Ethylhexyl acrylate: available from Sigma-Aldrich
Methyl methacrylate: available from Sigma-Aldrich
Butyl acrylate: available from Sigma-Aldrich
Di-t-Amyl Peroxide is Luperox DTA from Arkema
tert-Butyl peroxy-3,5,5-trimethylhexanoate: available from Akzo Nobel
Xylene
n-Butyl Acetate from Aldrich
Dichloromethane from Biosolve
Thinner: A: is a mixture of Xylene 50 wt %, Toluene 30 wt %, ShellsolA 10 wt %, 2-Ethoxyethylacetate 10 wt %. Thinner B: is butyl acetate
Curing agents, HDI: 1,6-hexamethylene diisocyanate trimer, Desmodur N3390 BA from Bayer Material Science or Tolonate HDT LV2 from Perstorp
Leveling agent: 'BYK 10 wt %' which is BYK-331 diluted at 10% in butyl acetate
Catalyst: 'DBTDL 1 wt %' which is Dibutyl Tin Dilaurate diluted at 1 wt % in butyl acetate
Catalyst: 'DBTDL 10 wt %' which is Dibutyl Tin Dilaurate diluted at 10 wt % in butyl acetate Example 01

Comparative

The following constituents were charged to a reaction vessel: 2.5500 grams of a neononanoic glycidyl ester of composition D, 1.1571 grams of dichloromethane, 0.0137 grams of boron trifluoride diethyl etherate. The reaction took place for 3 days at room temperature and the solvent was then thoroughly removed by evaporation. The polyether had a molecular weight (Mw) of 1900 Daltons and a Tg of −40.5° C.

Example 02

The following constituents were charged to a reaction vessel: 2.5438 grams of a neononanoic glycidyl ester of composition C, 1.0150 grams of dichloromethane, 0.0128 grams of boron trifluoride diethyl etherate. The reaction took place for 3 days at room temperature and the solvent was then thoroughly removed by evaporation. The polyether had a molecular weight (Mw) of 1500 Daltons and a Tg of −51.1° C.

Observations: Tg of the modified polyether resin is impacted by the composition of the neononanoic glycidyl ester (see examples 01, 02).

Example 03

Polyether Resin

The following constituents were charged to a reaction vessel equipped with a stirrer, a thermometer and a condenser: 134 grams of di-Trimethylol propane (DTMP), 900 grams of glycidyl neononanoate, GE9S, 135.5 grams of n-butylacetate (BAC) and 2.5 grams of Tin 2 Octoate. The mixture was heated to its reflux temperature of about 180° C. for about 4 hours till the glycidyl neononaoate was converted to an epoxy group content of less than 0.12 mg/g. After cooling down the polyether had a solids content of about 88%.

Example 04

Comparative

Polyether Resin

The following constituents were charged to a reaction vessel equipped with a stirrer, a thermometer and a condenser: 28.8 grams of monopentaerythritol, 201.5 grams of Cardura E10P, 19.4 grams of n-butylacetate and 0.3552 grams of Tin (II) 2-ethylhexanoate. The mixture was heated to a temperature of about 180° C. for about 6 hours until the Cardura E10P was converted to an epoxy group content of about 25 mmol/kg. After cooling down the polyether had a solids content of about 94%.

Example 05

Polyether Resin

The following constituents were charged to a reaction vessel equipped with a stirrer, a thermometer and a condenser: 28.8 grams of monopentaerythritol, 187.1 grams of GE9S, 18.3 grams of n-butylacetate and 0.3550 grams of Tin (II) 2-ethylhexanoate. The mixture was heated to a temperature of about 180° C. for about 5.5 hours till the GE9S was converted to an epoxy group content of about 29 mmol/kg. After cooling down the polyether had a solids content of about 95%.

Example 06

Comparative

Polyether Resin

The following constituents were charged to a reaction vessel equipped with a stirrer, a thermometer and a condenser: 28.8 grams of monopentaerythritol, 189.4 grams of GE9H, 18.5 grams of n-butylacetate and 0.3572 grams of Tin (II) 2-ethylhexanoate. The mixture was heated to a temperature of about 180° C. for about 4 hours till the GE9H was converted to an epoxy group content of about 27 mmol/kg. After cooling down the polyether had a solids content of about 95%.

Formulation of the Clear Coats

A clear coat is formulated with one of the polyether (from examples 04, 05, or 06), the curing agent (HDI, Desmodur N3390), the thinner (Methyl Amyl Ketone), the levelling agent (BYK-331) and the catalyst (dibutyltin dilaurate, DBTDL) according to the amounts indicated in Table 3.

TABLE 3

Clear coats, formulations

| CEP-Example | Binder (ID) | Binder (g) | HDI (g) | BYK 10 wt % (g) | DBTDL 1 wt % (g) | Thinner (g) |
|---|---|---|---|---|---|---|
| CEP-04 | From Example 04 | 40.1 | 30.7 | 0.47 | 1.03 | 15.1 |
| CEP-05 | From Example 05 | 40.0 | 33.0 | 0.48 | 1.07 | >12.5 |
| CEP-06 | From Example 06 | 40.0 | 32.5 | 0.48 | 1.06 | 17.7 |

Characterization of the Clear Coats

The clearcoat formulations (from table 3) are barcoat applied on degreased Q-panel, optionally on basecoated Q-panel. The panels are dried at room temperature after a preliminary stoving at 60° C. for 30 min. Clear coats have been characterized among others by measuring the Koenig hardness development (see Table 4).

TABLE 4

Clear coats, drying (curing) properties

| | CEP-04 | CEP-05 | CEP-06 |
|---|---|---|---|
| 1°/Koenig Hardness (Degreased Q panels) (sec) | | | |
| 6 hours | 8 | 10 | 11 |
| 24 hours | 10 | 11 | 47 |
| 7 days | 18 | 20 | 94 |
| 2°/Koenig Hardness (Basecoated Q panels) (sec) | | | |
| 6 hours | 7 | 8 | 7 |
| 24 hours | 8 | 8 | 14 |
| 7 days | 12 | 13 | 34 |

Example 07

Polyester-Ether Resin

The following constituents were charged to a reaction vessel equipped with a stirrer, a thermometer and a condenser: 456 g of GE9S, 134 g of dimethylolpropionic acid and 0.35 g of stannous octoate.

The mixture was heated to a temperature of about 110° C. for about 1 hour and then steadily increased to 150° C. in 3 hours and then cooled down.

This polyester-ether was then formulated in high solids and very high solids 2K polyurethane topcoats either as sole binder or as reactive diluent for an acrylic polyol.

We claim:

1. A process to prepare a composition of polyether polyol resin comprising reacting at least one polyol having at least three hydroxyl groups and a composition of α,α-branched alkane carboxylic glycidyl esters from butene oligomers, comprising a glycidyl ester mixture of neo-acids derived from a dimer or trimer of butene having both blocked isomers and highly branched isomers wherein a sum of a concentration of blocked isomers and the concentration of highly branched isomers is a maximum of 55 wt % based on the weight of the composition of α,α-branched alkane carboxylic glycidyl esters, wherein the highly branched isomers are isomers of neo-acids having at least 5 methyl groups.

2. The process of claim 1, wherein the composition of α,α-branched alkane carboxylic glycidyl esters is based on a neononanoic acid mixture wherein the sum of the concentration of the blocked and of the highly branched isomers is a maximum of 55 wt % based on the total weight of the composition.

3. The process of claim 2 wherein the composition of α,α-branched alkane carboxylic glycidyl esters comprises 2,2-dimethyl heptanoic acid glycidyl ester, or 2-methyl 2-ethyl hexanoic acid glycidyl ester or 2-methyl 2-ethyl 3-methyl pentanoic acid glycidyl esters.

4. The process of claim 2 wherein the composition of α,α-branched alkane carboxylic glycidyl esters comprises 2-methyl 2-ethyl 3-methyl pentanoic acid glycidyl ester stereoisomers in an amount below 40 wt % based on the total weight of the composition.

5. The process of claim 4 wherein the mixture of α,α-branched alkane carboxylic glycidyl esters comprises 2-methyl 2-ethyl 3-methyl pentanoic acid glycidyl ester stereoisomers in an amount below 30 wt % based on the total weight of the composition.

6. The process of claim 4 wherein the mixture of α,α-branched alkane carboxylic glycidyl esters comprises 2-methyl 2-ethyl 3-methyl pentanoic acid glycidyl ester stereoisomers in an amount below or equal to 25 wt % based on the total weight of the composition.

7. The process of claim 2 wherein the composition of α,α-branched alkane carboxylic glycidyl esters comprises 2-methyl 2-ethyl hexanoic acid glycidyl ester in an amount above 10 wt % based on the total weight of the composition.

8. The process of claim 7 wherein the mixture of α,α-branched alkane carboxylic glycidyl esters comprises 2-methyl 2-ethyl hexanoic acid glycidyl ester in an amount above 30 wt % based on the total weight of the composition.

9. The process of claim 7 wherein the mixture of α,α-branched alkane carboxylic glycidyl esters comprises 2-methyl 2-ethyl hexanoic acid glycidyl ester in an amount above 45 wt % based on the total weight of the composition.

10. The process of claim 2 wherein the composition of α,α-branched alkane carboxylic glycidyl esters comprises 2,2-dimethyl heptanoic acid glycidyl ester, 2-methyl 2-ethyl hexanoic acid glycidyl ester and 2-methyl 2-ethyl 3-methyl pentanoic acid glycidyl ester stereoisomers in an amount above 40 wt % based on the total weight of the composition.

11. The process of claim 10 wherein the mixture of α,α-branched alkane carboxylic glycidyl esters comprises 2,2-dimethyl heptanoic acid glycidyl ester, 2-methyl 2-ethyl hexanoic acid glycidyl ester and 2-methyl 2-ethyl 3-methyl pentanoic acid glycidyl ester stereoisomers in an amount above 55 wt % based on the total weight of the composition.

12. The process of claim 10 wherein the mixture of α,60 -branched alkane carboxylic glycidyl esters comprises 2,2-dimethyl heptanoic acid glycidyl ester, 2-methyl 2-ethyl hexanoic acid glycidyl ester and 2-methyl 2-ethyl 3-methyl pentanoic acid glycidyl ester stereoisomers in an amount above 65 wt % based on the total weight of the composition.

13. The process of claim 2 wherein the composition of α,α-branched alkane carboxylic glycidyl esters comprises 2,2-dimethyl heptanoic acid glycidyl ester in an amount of 1 to 15 wt %, 2-methyl 2-ethyl hexanoic acid glycidyl ester in an amount of 40 to 70 wt % and 2-methyl 2-ethyl 3-methyl pentanoic acid glycidyl ester stereoisomers in an amount of 8 to 32 wt % based on the total weight of the composition.

14. The process of claim 2 wherein the composition of α,α-branched alkane carboxylic glycidyl esters comprises 2,2-dimethyl heptanoic acid glycidyl ester in an amount of 2 to 10 wt %, 2-methyl 2-ethyl hexanoic acid glycidyl ester in an amount of 47 to 61 wt % and 2-methyl 2-ethyl 3-methyl pentanoic acid glycidyl ester stereoisomers in an amount of 10 to 25 wt % based on the total weight of the composition.

15. The process of claim 2 wherein the sum of the concentration of the blocked isomers and of the highly branched isomers is below 40 wt % based on the total weight of the composition.

16. The process of claim 2 wherein the sum of the concentration of the blocked isomers and of the highly branched isomers is below 30 wt % based on the total weight of the composition.

17. The process of claim 1 wherein the polyether polyol resin composition has a number average molecular weight (Mn) lower than 4500 Dalton according the polystyrene standard or has an hydroxyl value above 120 mg KOH/g on solids.

18. The process of claim 1, wherein the sum of the concentration of the blocked isomers and of the highly branched isomers is below 40 wt % based on the total weight of the composition.

19. The process of claim 1, wherein the sum of the concentration of the blocked isomers and of the highly branched isomers is below 30 wt % based on the weight of the composition.

20. The process of claim 1 wherein the mixture of α,α-branched alkane carboxylic glycidyl esters is derived from butene oligomers.

21. A binder composition useful for a coating application with a low VOC and comprising the polyether polyol resin composition from the process of claim 1.

22. A metal or plastic substrate coated with a coating composition comprising the binder composition of claim 21.

23. A polyester-ether resin comprising the reaction product of the polyether polyol resin composition from the process of claim 1 and dimethylol propionic acid.

* * * * *